(12) United States Patent
Lee et al.

(10) Patent No.: US 8,395,574 B2
(45) Date of Patent: Mar. 12, 2013

(54) LIQUID CRYSTAL DISPLAY DEVICE AND METHOD OF DRIVING THE SAME

(75) Inventors: Hwi-Deuk Lee, Gyeongsangbuk-do (KR); Jae-Seok Park, Daegu (KR); Dong-Seok Park, Guyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 726 days.

(21) Appl. No.: 12/642,030

(22) Filed: Dec. 18, 2009

(65) Prior Publication Data
US 2011/0069090 A1 Mar. 24, 2011

(30) Foreign Application Priority Data
Sep. 23, 2009 (KR) .................. 10-2009-0090019

(51) Int. Cl.
*G09G 3/36* (2006.01)
(52) U.S. Cl. .......................... 345/92; 345/690
(58) Field of Classification Search .................. None
See application file for complete search history.

(56) References Cited

U.S. PATENT DOCUMENTS

| | | | |
|---|---|---|---|
| 7,333,170 B2 * | 2/2008 | Baek ........................ | 349/141 |
| 7,749,823 B2 * | 7/2010 | Ahn et al. ................. | 438/157 |
| 7,768,588 B2 * | 8/2010 | Kwon et al. ............... | 349/43 |
| 7,903,063 B2 * | 3/2011 | Chung et al. .............. | 345/87 |
| 2007/0109481 A1 | 5/2007 | Mimura et al. | |
| 2007/0153196 A1 | 7/2007 | Jang et al. | |
| 2008/0094546 A1 | 4/2008 | Kim et al. | |
| 2008/0273134 A1 * | 11/2008 | Kim et al. ................. | 349/43 |

FOREIGN PATENT DOCUMENTS
WO WO 2008/047497 4/2008

* cited by examiner

*Primary Examiner* — Jason Olson
(74) *Attorney, Agent, or Firm* — Morgan, Lewis & Bockius LLP (57) ABSTRACT

A liquid crystal display device includes first and second substrates, a liquid crystal layer disposed therebetween, first and second gate lines on the first substrate, first, second and third data lines crossing the first and second gate lines to define first, second, third, fourth, fifth and sixth pixel regions, a first pixel electrode and a first common electrode in each of the first, second and third pixel regions, the first pixel electrode connected to a thin film transistor and the first common electrode spaced apart from the first pixel electrode, a second pixel electrode in each of the fourth, fifth and sixth pixel regions, the second pixel electrode connected to the thin film transistor and having a plate shape, a color filter layer including a red color filter corresponding to each of the first and fourth pixel regions, a green color filter corresponding to each of the second and fifth pixel regions, a blue color filter corresponding to each of the third and sixth pixel regions, a second common electrode on the color filter layer in each of the fourth, fifth and sixth pixel regions.

18 Claims, 9 Drawing Sheets

*(related art)*

FIG. 1

*(related art)*

*FIG. 2*

*(related art)*

LIQUID CRYSTAL DISPLAY DEVICE AND METHOD OF DRIVING THE SAME

This application claims the benefit of Korean Patent Application No. 10-2009-0090019, filed on Sep. 23, 2009, which is hereby incorporated by reference in its entirety.

BACKGROUND OF THE INVENTION

1. Field of the Invention

The present invention relates to a liquid crystal display (LCD) device, and more particularly, to a viewing-angle image control (VIC) type LCD device that is able to selectively operate in a wide viewing angle mode or a narrow viewing angle mode for both a black-and-white image and a color image, and a method of driving the LCD device.

2. Background of the Related Art

As information technology progresses, flat panel display (FPD) devices having light weight, thin profile and low power consumption have been developed. Among various types of FPD devices, liquid crystal display (LCD) devices have been widely used because of their advantages in resolution, color reproducibility and display quality profile.

In general, an LCD device includes two substrates spaced apart from each other and a liquid crystal layer disposed between the two substrates. There are electrodes formed on the two substrates, to which a voltage is applied to generate an electric field, thereby re-aligning liquid crystal molecules in the liquid crystal layer. Thus, according to re-alignment of the liquid crystal molecules, the LCD device changes light transmittance of the liquid crystal layer to display images.

Figure 1:
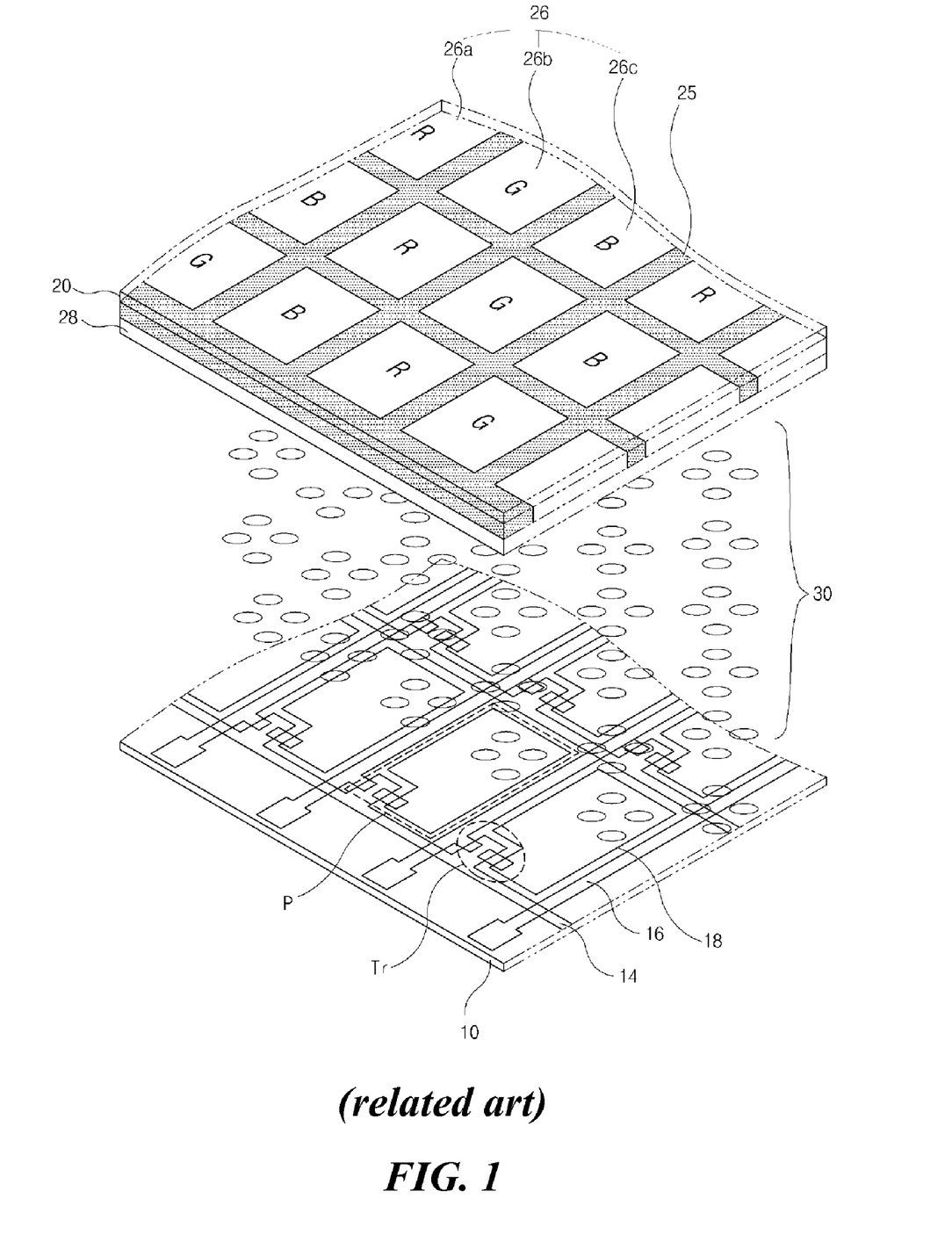
FIG. 1 is an exploded perspective view schematically showing a liquid crystal display (LCD) device according to the related art.

FIG. 1 is an exploded perspective view schematically showing an LCD device according to the related art. As shown in FIG. 1, the related art LCD device includes a first substrate 10, a second substrate 20 and a liquid crystal layer 30. The first substrate 10, which is referred to as an array substrate, includes a gate line 14 and a data line 16 crossing each other, thereby defining a pixel region P. A pixel electrode 18 and a thin film transistor (TFT) Tr, as a switching element, are positioned in each pixel region P. The TFT Trs, which are each disposed adjacent to the crossing of the gate line 14 and the data line 16, are disposed in a matrix on the first substrate 10. The second substrate 20, which is referred to as a color filter substrate, includes color filter layer 26 including red (R), green (G) and blue (B) color filters 26a, 26b and 26c, a black matrix 25 between the red, green and blue color filters 26a, 26b and 26c, and a common electrode 28 on both the color filter layer 26 and the black matrix 25.

Although not shown in FIG. 1, the first and second substrates 10 and 20 are attached with a seal pattern to prevent leakage of the liquid crystal layer 30. In addition, a first alignment layer is formed between the first substrate 10 and the liquid crystal layer 30 and a second alignment layer is formed between the second substrate 20 and the liquid crystal layer 30, thereby aligning the liquid crystal molecules in the liquid crystal layer 30 along an initial alignment direction. A polarization plate is formed on an outer surface of at least one of the first and second substrates 10 and 20.

Further, a backlight unit (not shown) disposed under the first substrate 10 serves to supply light. A gate signal serves to turn the TFT Tr on and is sequentially applied to each of the gate lines 14, and a data signal on the data line 16 is applied to the pixel electrode 18 in the pixel region P. The liquid crystal molecules in the liquid crystal layer 30 are driven by a vertical electric field generated between the pixel electrode 18 and the common electrode 28 to display images by varying the light transmittance of the liquid crystal layer 30.

Recently, the LCD device has been widely utilized as a display panel for a personal terminal, a portable computer or a mobile phone in a public space. It is occasionally required that the information of the portable device including the LCD device be viewed only by the user and the others around the user should be prevented from watching the information. As a result, a viewing-angle image control (VIC) type LCD device, which is able to selectively display images at one of wide and narrow viewing angles, has been suggested.

Figure 2:
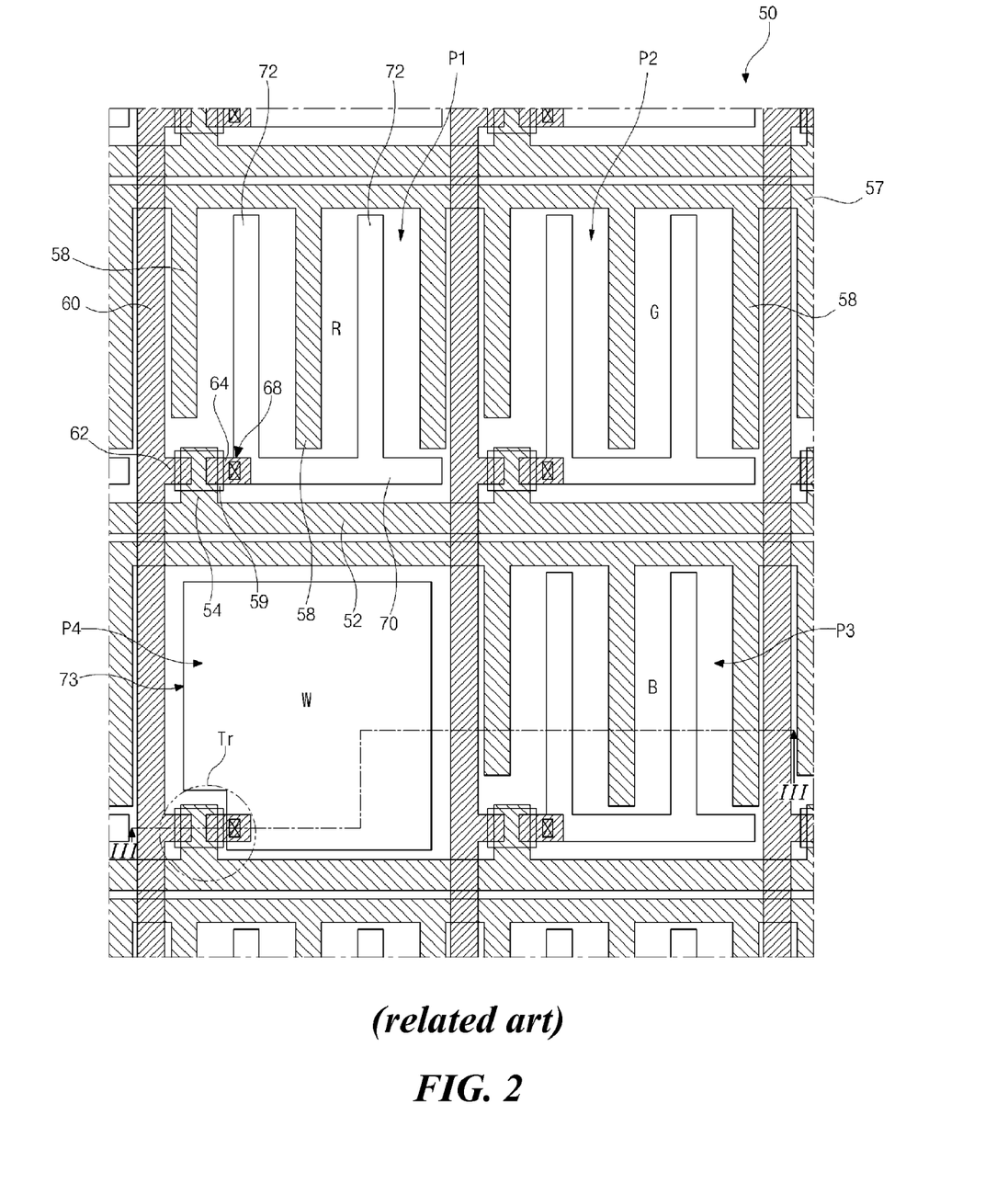
FIG. 2 is a plane view schematically showing a viewing-angle image control (VIC) type LCD device according to the related art.
Figure 3:
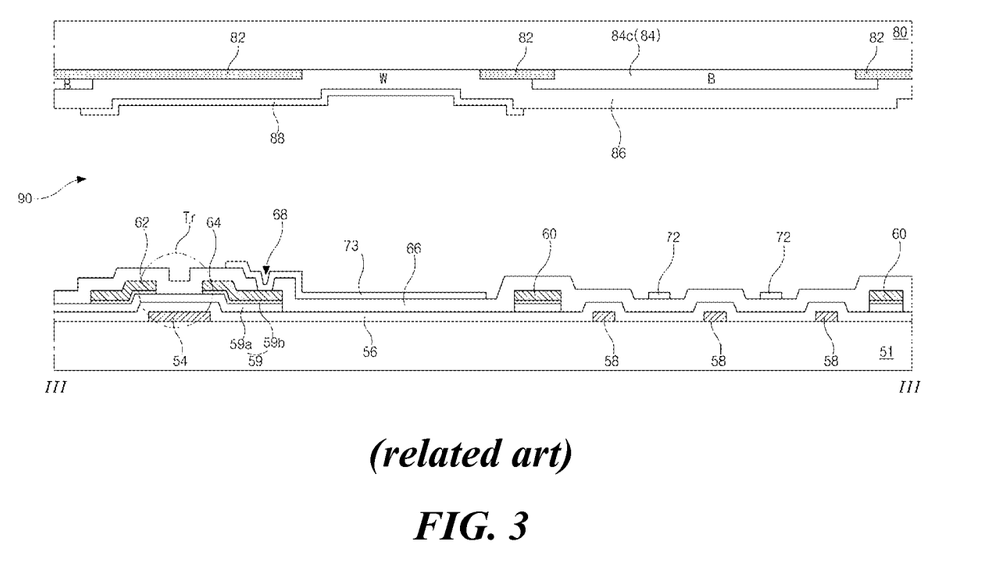
FIG. 3 is a cross-sectional view of the related art VIC type LCD device taken along a line III-III of FIG. 2.

FIG. 2 is a plane view schematically showing a VIC type LCD device according to the related art, and FIG. 3 is a cross-sectional view of the VIC type LCD device taken along a line III-III of FIG. 2. As shown in FIGS. 2 and 3, a VIC type LCD device 50 includes first and second substrates 51 and 80 and a liquid crystal layer 90 between the first and second substrates 51 and 80. A gate line 52 and a data line 60 are formed on an inner surface of the first substrate 51. The gate line 52 and the data line 60 cross each other to define first, second, third and fourth pixel regions P1, P2, P3 and P4 constituting a unit region for a color display. A thin film transistor (TFT) Tr is connected to the gate line 52 and the data line 60, and a common line 57 is formed to be parallel to the gate line 52. The TFT Tr includes a gate electrode 54, a gate insulating layer 56, a semiconductor layer 59 including an active layer 59a and an ohmic contact layer 59b, a source electrode 62 and a drain electrode 64.

A plurality of first pixel electrodes 72 are formed in each of the first, second and third pixel regions P1, P2 and P3 and are connected to the drain electrode 64. The plurality of first pixel electrodes 72 each have a bar shape and are spaced apart from each other. In addition, a plurality of first common electrodes 58 are formed in each of the first, second and third pixel regions P1, P2 and P3 and are connected to the common line 57. The plurality of first common electrodes 58 each have a bar shape and alternate with the plurality of first pixel electrodes 72. Further, a second pixel electrode 73 is formed in the fourth pixel region P4. The second pixel electrode 73 has a plate shape and is connected to the drain electrode 64.

A black matrix 82 is formed on an inner surface of the second substrate 80, and a color filter layer 84 is formed on the black matrix 82 and the inner surface of the second substrate 80 in the first, second and third pixel regions P1, P2 and P3. The color filter layer 84 includes red, green and blue color filters 84c, and is not formed in the fourth pixel region P4. An overcoat layer 86 is formed on the color filter layer 84 in the first, second and third pixel regions P1, P2 and P3 and on the inner surface of the second substrate 80 in the fourth pixel region P4. Further, a second common electrode 88 has a plate shape and is formed on the overcoat layer 86 in the fourth pixel region P4.

In each of the first, second and third pixel regions P1, P2 and P3 having the color filter layer 84, a horizontal electric field is generated between the plurality of first pixel electrodes 72 and the plurality of first common electrodes 58 over the first substrate 51, and the liquid crystal layer 90 is controlled by the horizontal electric field, thereby displaying images with a wide viewing angle. In the fourth pixel region P4 having no color filter, a vertical electric field is generated between the second pixel electrode 73 over the first substrate 51 and the second common electrode 88 over the second substrate 80, and the liquid crystal layer 90 is controlled by the vertical electric field to have a relatively high transmittance along an oblique direction with respect to a front direction normal to the second substrate 80 and a relatively low transmittance along the front direction. Accordingly, when a voltage is applied to the second pixel electrode 73 and the second common electrode 88, image display along the oblique direction is restricted by the fourth pixel region P4, and the VIC type LCD device 50 of the related art operates in a narrow viewing angle mode. As a result, the related art VIC type LCD device 50 selectively operates in one of a wide viewing angle mode and a narrow viewing angle mode.

The VIC type LCD device 50 may operates in a narrow viewing angle mode for displaying a black-and-white image such as a document having a text. However, since the fourth pixel region P4 does not include a color filter pattern, the fourth pixel region P4 merely displays a black-and-white image instead of a color image, and does not sufficiently adjust a viewing angle of the VIC type LCD device 50. Accordingly, a color image of the first, second and third pixel regions P1, P2 and P3 is displayed along the oblique direction even when the VIC type LCD device 50 operates in a narrow viewing angle mode.

SUMMARY OF THE INVENTION

Accordingly, embodiments of the present invention are directed to a liquid crystal display (LCD) device and a method of driving the same that substantially obviate one or more of the problems due to limitations and disadvantages of the related art.

An embodiment of the present invention provides a viewing-angle image control type liquid crystal display device where both a black and white image and a color image are effectively restricted along an oblique direction with respect to a front direction normal to the liquid crystal display device in a narrow viewing angle mode.

Additional features and advantages of the invention will be set forth in the description of exemplary embodiments which follows, and in part will be apparent from the description of the exemplary embodiments, or may be learned by practice of the exemplary embodiments of the invention. These and other advantages of the invention will be realized and attained by the structure particularly pointed out in the written description of the exemplary embodiments and claims hereof as well as the appended drawings.

To achieve these and other advantages and in accordance with the purpose of the present invention, as embodied and broadly described in the following exemplary embodiments, a liquid crystal display device includes first and second substrates facing and spaced apart from each other, first and second gate lines on an inner surface of the first substrate; first, second and third data lines crossing the first and second gate lines to define first, second, third, fourth, fifth and sixth pixel regions, a thin film transistor connected to one of the first and second gate lines and one of the first, second and third data lines, a first pixel electrode and a first common electrode in each of the first, second and third pixel regions, the first pixel electrode connected to the thin film transistor and the first common electrode spaced apart from the first pixel electrode, a second pixel electrode in each of the fourth, fifth and sixth pixel regions, the second pixel electrode connected to the thin film transistor and having a plate shape, a black matrix on an inner surface of the second substrate, a color filter layer on the black matrix, the color filter layer including red, green and blue color filters, the red color filter corresponding to each of the first and fourth pixel regions, the green color filter corresponding to each of the second and fifth pixel regions, and the blue color filter corresponding to each of the third and sixth pixel regions, a second common electrode on the color filter layer in each of the fourth, fifth and sixth pixel regions; and a liquid crystal layer between the first and second substrates.

To achieve these and other advantages and in accordance with the purpose of the present invention, as embodied and broadly described in the following exemplary embodiments, there is a method of driving a liquid crystal display device including first and second substrates facing each other with a liquid crystal layer between the first and second substrates and having first, second, third, fourth, fifth and sixth pixel regions, a first pixel electrode and a first common electrode in each of the first, second and third pixel regions on an inner surface of the first substrate, the first common electrode spaced apart from the first pixel electrode, a second pixel electrode having a plate shape in each of the fourth, fifth and sixth pixel regions, a color filter layer on an inner surface of the second substrate, the color filter layer including a red color filter corresponding to each of the first and fourth pixel regions, a green color filter corresponding to each of the second and fifth pixel regions, and a blue color filter corresponding to each of the third and sixth pixel regions; and a second common electrode on the color filter layer in each of the fourth, fifth and sixth pixel regions. The method includes applying a first voltages to the first pixel electrode to generate a horizontal electric field between the first pixel electrode and the first common electrode in each of the first, second and third pixel regions, and applying a second voltage to the second pixel electrode to generate a vertical electric field between the second pixel electrode and the second common electrode in each of the fourth, fifth and sixth pixel regions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of embodiments of the present invention and are incorporated in and constitute a part of this application, illustrate embodiments of the present invention and together with the description serve to explain the principle of embodiments of the present invention. In the drawings.

DETAILED DESCRIPTION OF THE PREFERRED EMBODIMENTS

Reference will now be made in detail to exemplary embodiments of the present invention, which are illustrated in the accompanying drawings. Wherever possible, the same reference numbers will be used throughout the drawings to refer to the same or similar parts.

Figure 4:
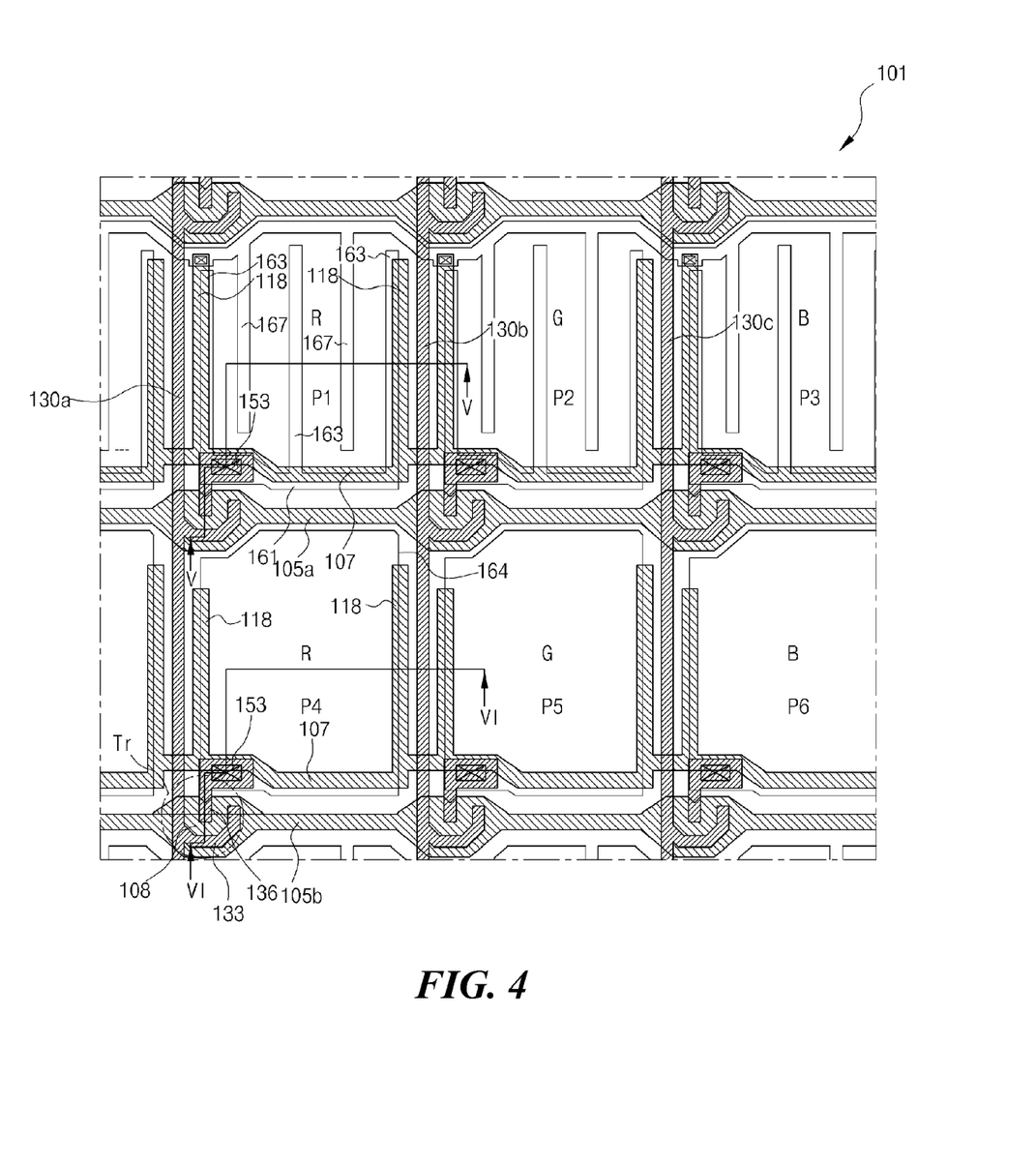
FIG. 4 is a plane view schematically showing a VIC type LCD device according to a first exemplary embodiment of the present invention.
Figure 5:
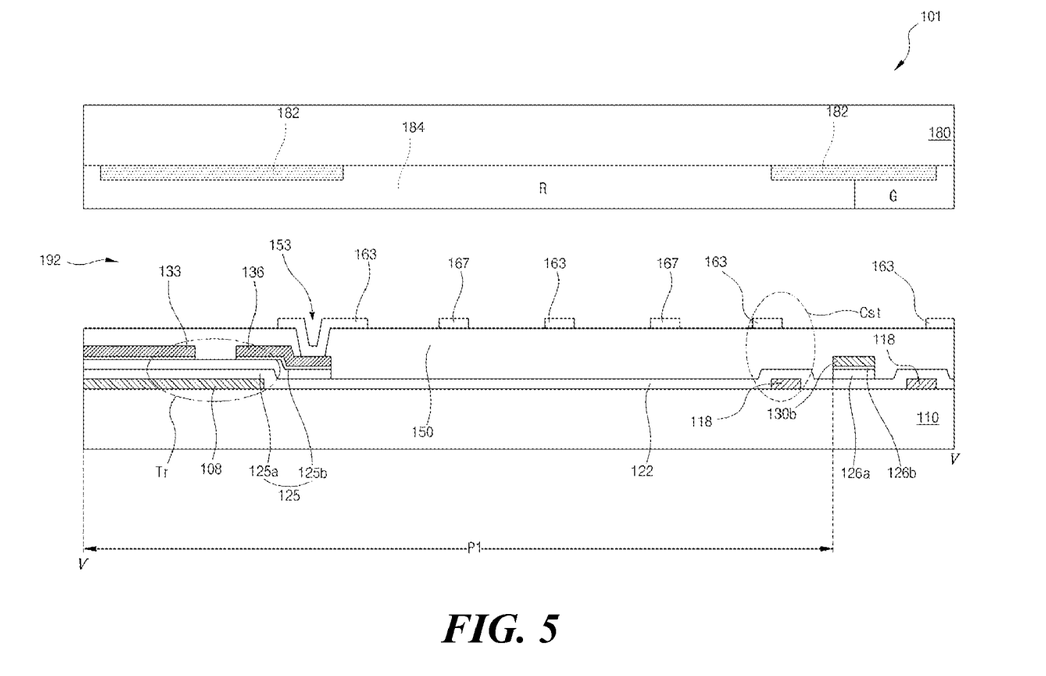
FIG. 5 is a cross-sectional view of the VIC type LCD device taken along a line V-V of FIG. 4.
Figure 6:
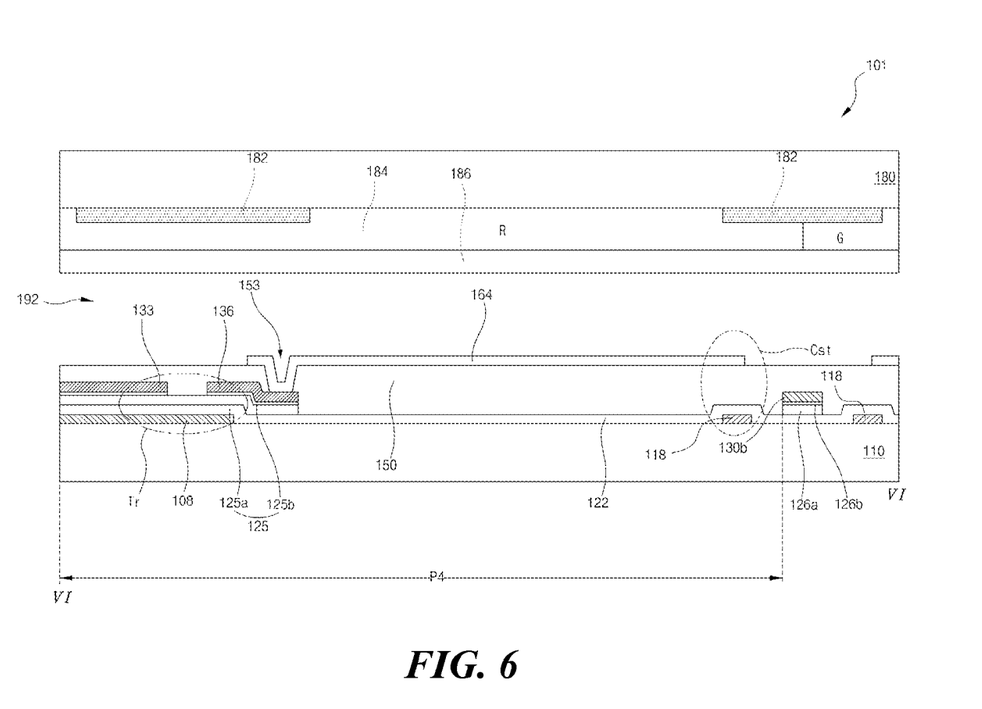
FIG. 6 is a cross-sectional view of the VIC type LCD device taken along a line VI-VI of FIG. 4.

FIG. 4 is a plane view schematically showing a viewing-angle image control (VIC) type liquid crystal display (LCD) device according to a first exemplary embodiment of the present invention, and FIGS. 5 and 6 are cross-sectional views of the VIC type LCD device taken along lines V-V and VI-VI, respectively, of FIG. 4. For illustration, only an array substrate is shown and a color filter substrate is omitted in FIG. 4.

As shown in FIGS. 4, 5 and 6, an VIC type LCD device 101 includes first and second substrates 110 and 180 facing and spaced apart from each other, and a liquid crystal layer 192 disposed between the first and second substrates 110 and 180. The first substrate 110 has first and second gate lines 105a and 105b and a common line 107 formed on an inner surface thereof. The common line 107 is parallel to each of the first and second gate lines 105a and 105b. A gate insulating layer 122 is formed on the first and second gate lines 105a and 105b and the common line 107. First, second and third data lines 130a, 130b and 130c are formed on the gate insulating layer 122. The first, second and third data lines 130a, 130b and 130c cross the first and second gate lines 105a and 105b, thereby defining first, second, third, fourth, fifth and sixth pixel regions P1, P2, P3, P4, P5 and P6, which are arranged in a 2×3 matrix, thereby generating a unit region for a color display.

In each of the first to sixth pixel regions P1 to P6, a gate electrode 108 is formed on the first substrate 110 and connected to each of the first and second gate lines 105a and 105b, and the gate insulating layer 122 is formed on the gate electrode 108. A semiconductor layer 125 is formed on the gate insulating layer 122 over the gate electrode 108, and source and drain electrodes 133 and 136 are formed on the semiconductor layer 125. The semiconductor layer 125 includes an active layer 125a of intrinsic amorphous silicon and an ohmic contact layer 125b of impurity-doped amorphous silicon. In addition, the source electrode 133 is connected to each of the first, second and third data lines 130a, 130b and 130c, and the drain electrode 136 is spaced apart from the source electrode 133. The gate electrode 108, the gate insulating layer 122, the semiconductor layer 125, the source electrode 133 and the drain electrode 136 constitute a thin film transistor (TFT) Tr.

Although the TFT Tr includes a U-shaped channel and is disposed over each of the first and second gate lines 105a and 105b in FIGS. 4, 5 and 6, the TFT Tr is not limited to the U-shaped channel and may include a channel of a different shape and may be disposed inside each of the first to sixth pixel regions P1 to P6. In addition, a passivation layer 150 may be formed on the first, second and third data lines 130a, 130b and 130c and the TFT Tr.

In each of the first, second and third pixel regions P1, P2 and P3, a plurality of first pixel electrodes 163, a connection line 161 connecting the plurality of first pixel electrodes 163 and a plurality of first common electrodes 167 are formed on the passivation layer 150. Each of the plurality of first pixel electrodes 163 may have a bar shape, and each of the plurality of first common electrodes 167 may also have a bar shape. The plurality of first pixel electrodes 163 are spaced apart from each other and are connected to the drain electrode 136 through a drain contact hole 153 in the passivation layer 150.

The plurality of first common electrodes 167 are spaced apart from each other and are connected to the common line 107. In addition, the plurality of first common electrodes 167 of the first, second and third pixel regions P1, P2 and P3 are connected to each other through the common line 107.

The plurality of first pixel electrodes 163 alternate with and are parallel to the plurality of first common electrodes 167, thereby generating a horizontal electric field. In addition, auxiliary common electrodes 118 protruding from the common line 107 are formed on the first substrate 110 to prevent light leakage through a boundary portion of each pixel region and overlap the outermost first pixel electrodes of the plurality of first pixel electrodes 163 to constitute a storage capacitor Cst. Since the connection electrode 161 overlaps the common line 107 to constitute another storage capacitor, the auxiliary common electrodes 118 may not overlap the outermost first pixel electrodes in another exemplary embodiment.

Although the plurality of first pixel electrodes 163 and the plurality of first common electrodes 167 each have a straight bar shape in the above exemplary embodiment, they are not limited to the straight bar shape, and may each have a bent bar shape having a bent portion to obtain a multi-domain for preventing a color inversion in another exemplary embodiment. When a bent bar shape is used, the auxiliary common electrode 118 and the first, second and third data lines 130a, 130b and 130c may each have a bent bar shape, and thus the first, second and third data lines 130a, 130b and 130c each have a zigzag bar shape throughout the whole first substrate 110. As a result, each of the first, second and third pixel regions P1, P2 and P3 is driven by the horizontal electric field between each first pixel electrode 163 and each first common electrode 167 over the first substrate 110.

In each of the fourth, fifth and sixth pixel regions P4, P5 and P6, a second pixel electrode 164 is formed on the passivation layer 150 and may have a plate shape. The second pixel electrode 164 is connected to the drain electrode 136 through the drain contact hole 153. The auxiliary common electrodes 118 protruding from the common line 107 overlap the second pixel electrode 164, thereby constituting a storage capacitor Cst. Since the second pixel electrode 164 overlaps the common line 107 to constitute another storage capacitor, the auxiliary common electrodes 118 may be formed only to prevent light leakage through a boundary portion of each pixel region without overlapping the second pixel electrode 164 in another exemplary embodiment.

A black matrix 182 is formed on an inner surface of the second substrate 180, and a color filter layer 184 is formed on the black matrix 182 and the second substrate 180. The black matrix 182 covers the first and second gate lines 105a and 105b, the first, second and third data lines 130a, 130b and 130c and the TFT Tr. The color filter layer 184 includes red (R), green (G) and blue (B) color filters. For example, the red color filter may correspond to the first and fourth pixel regions P1 and P4, the green color filter may correspond to the second and fifth pixel regions P2 and P5, and the blue color filter may correspond to the third and sixth pixel regions P3 and P6.

Moreover, in each of the fourth, fifth and sixth pixel regions P4, P5 and P6, a second common electrode 186 is formed on the color filter layer 184, thereby generating a vertical electric field with the second pixel electrode 164 over the first substrate 110. In another exemplary embodiment, an overcoat layer may be formed between the color filter layer 184 and the second common electrode 186 for planarizing and protecting the color filter layer 184. Thus, each of the fourth, fifth and sixth pixel regions P4, P5 and P6 may be driven by the vertical electric field between the second pixel electrode 164 over the first substrate 110 and the second common electrode 186 over the second substrate 180. In addition, a liquid crystal layer 192 is disposed between the first and second substrates 110.

Accordingly, the first, second and third pixel regions P1, P2 and P3 including red, green and blue color filters, respectively, and the fourth, fifth and sixth pixel regions P4, P5 and P6 including red, green and blue color filters, respectively, constitute a unit region for a full color display. Moreover, the first, second and third pixel regions P1, P2 and P3 are driven by the horizontal electric field between the first pixel electrode 163 and the first common electrode 167 to have an in-plane switching (IPS) mode, and the fourth, fifth and sixth pixel regions P4, P5 and P6 are driven by the vertical electric field between the second pixel electrode 164 and the second common electrode 186 to have an electrically controlled birefringence (ECB) mode.

Figure 7:
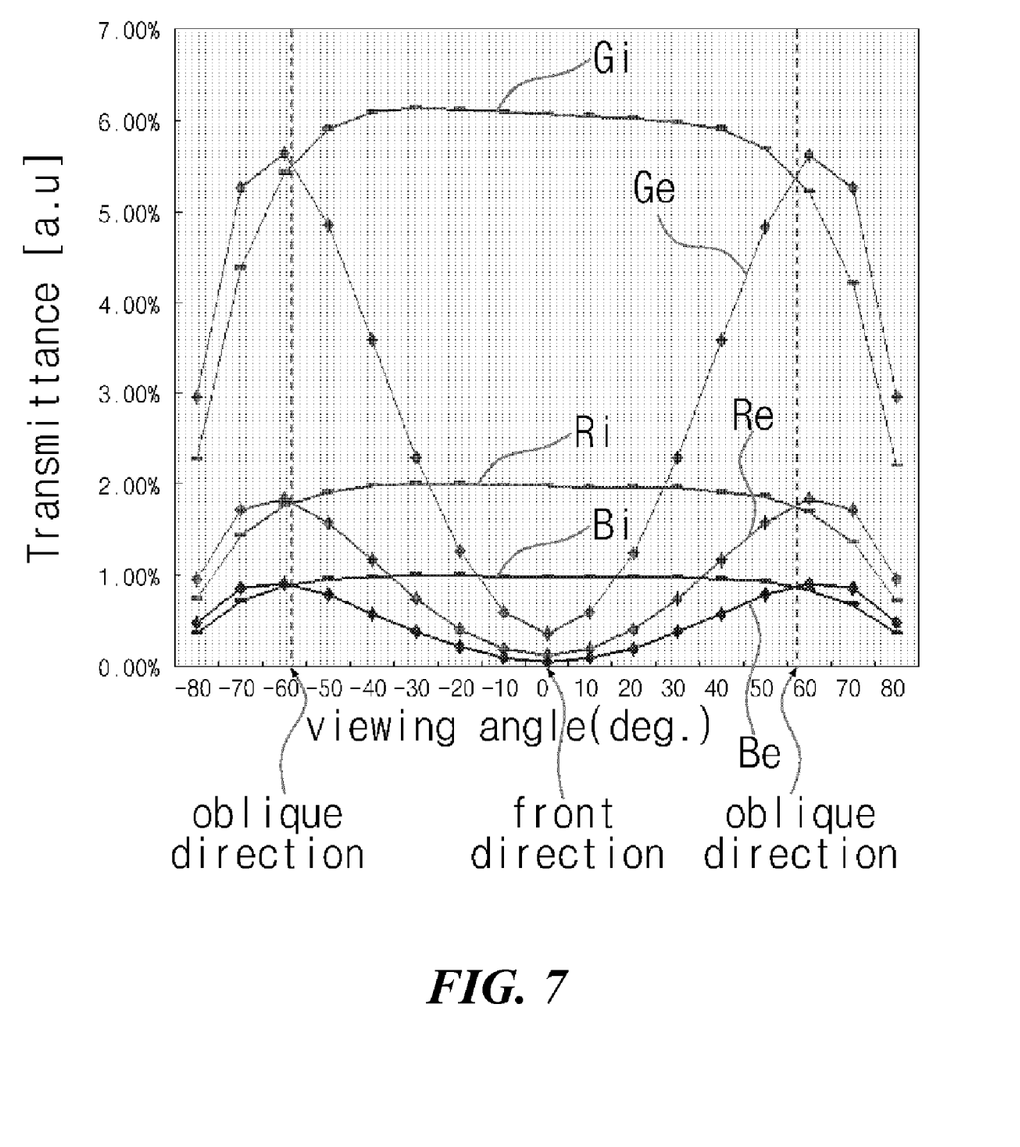
FIG. 7 is a graph schematically showing a transmittance with respect to an oblique angle in first to sixth pixel regions of the VIC type LCD device according to the first exemplary embodiment of the present invention.

FIG. 7 is a graph schematically showing a light transmittance with respect to an oblique angle in first to sixth pixel regions of a VIC type LCD device according to the first exemplary embodiment of the present invention. As shown in FIG. 7, x and y axes represent a viewing angle and a light transmittance, respectively, where the viewing angle may be defined as an azimuthal angle with respect to a front direction normal to the VIC type LCD device 101 (of FIG. 4) and an oblique direction may have a non-zero viewing angle. For example, the oblique direction may have a viewing angle within a range of about 45° to about 60°.

Each of transmittance curves Ri, Gi and Bi for first, second and third pixel regions P1, P2 and P3 (of FIG. 4) having an in-plane switching (IPS) mode has a flat portion in a viewing angle range between −60° and +60°, thereby displaying images with a wide viewing angle. On the other hand, each of transmittance curves Re, Ge and Be for fourth, fifth and sixth pixel regions P4, P5 and P6 (of FIG. 4) having an electrically controlled birefringence (ECB) mode has a minimum around a viewing angle of about 0° and has a maximum around viewing angles of about −60° and +60°. As a result, each of the fourth, fifth and sixth pixel regions P4, P5 and P6 does not transmit light along the front direction and transmits light with the maximum transmittance along the oblique direction at the viewing angles of about −60° and +60°.

In a wide viewing angle mode of the VIC type LCD device, since a voltage is not applied to each of the fourth, fifth and sixth pixel regions P4, P5 and P6, the fourth, fifth and sixth pixel regions P4, P5 and P6 display a black image along the front direction and the oblique direction. Accordingly, a full color image is viewed by the first, second and third pixel regions P1, P2 and P3 along the front direction and along the oblique direction. In a narrow viewing angle mode of the VIC type LCD device, since a voltage is applied to each of the fourth, fifth and sixth pixel regions P4, P5 and P6, the fourth, fifth and sixth pixel regions P4, P5 and P6 display a black image along the front direction. Accordingly, a full color image is viewed along the front direction.

However, along the oblique direction in the narrow viewing angle mode, each of the fourth, fifth and sixth pixel regions P4, P5 and P6 has a complementary transmittance against the transmittance of each of the first, second and third pixel regions P1, P2 and P3. Accordingly, the fourth, fifth and sixth pixel regions P4, P5 and P6 are driven in the ECB mode such that the sum of grey levels corresponding to the first and fourth pixel regions P1 and P4 is equal to the sum of grey levels corresponding to the second and fifth pixel regions P2 and P5 and is equal to the sum of grey levels corresponding to the third and sixth pixel regions P3 and P6. In the VIC type LCD device displaying 256-grey level image, for example, when the first, second and third pixel regions P1, P2 and P3 are driven to have grey levels of 127, 100 and 80, respectively, the fourth, fifth and sixth pixel regions P4, P5 and P6 may be driven to have grey levels of 128, 155 and 175, respectively. Since a red color is displayed by adding the grey levels of the first and fourth pixel regions P1 and P4, a red image of a grey level of 255 is displayed by the first and fourth pixel regions P1 and P4 along the oblique direction. Similarly, a green image of a grey level of 255 is displayed by the second and fifth pixel regions P2 and P5 along the oblique direction and a blue image of a grey level of 255 is displayed by the third and sixth pixel regions P3 and P6 along the oblique direction. As a result, a white image of a grey level 255 is displayed by the first to sixth pixel regions P1 to P6 along the oblique direction. Further, the first to sixth pixel regions of the other unit region for a color display are driven to display only a white image of a grey level of 255 along the oblique direction. Since white images having the same grey levels from a plurality of unit regions for a color display are viewed along the oblique direction in the narrow viewing angle mode, the image from the first, second and third pixel regions P1, P2 and P3 along the oblique direction is not recognized. The white image may be designed to have various grey levels.

In the narrow viewing angle mode of the VIC type LCD device 101, a user at the front direction views a full color image from the first, second and third pixel regions P1, P2 and P3, while the others at the oblique direction view only a white image of a predetermined grey level from the first to sixth pixel regions P1 to P6. As a result, the user's privacy can be protected. Since a white image is viewed along the oblique direction due to color complement, the VIC type LCD device 101 can operate selectively in the narrow viewing angle mode for a color image as well as a black-and-white image such as a document having a text.

Although the first, second and third pixel regions P1, P2 and P3 are driven by using an IPS mode using the first exemplary embodiment, the first, second and third pixel regions P1, P2 and P3 may be driven by using another wide viewing angle mode in another exemplary embodiment. For example, the first, second and third pixel regions P1, P2 and P3 may be driven by using a fringe field switching (FFS) mode where one of a pixel electrode and a common electrode has a plate shape and the other of the pixel electrode and the common electrode has a bar shape.

Moreover, when the fourth, fifth and sixth pixel regions P4, P5 and P6 are disposed to make a straight horizontal line, the straight horizontal line may deteriorate display quality along the front direction of the VIC type LCD device. Since the fourth, fifth and sixth pixel regions P4, P5 and P6 display a black image along the front direction, a black straight line due to the fourth, fifth and sixth pixel regions P4, P5 and P6 may be viewed along the front direction. Accordingly, the fourth, fifth and sixth pixel regions P4, P5 and P6 may be disposed to make a zigzag horizontal line in another exemplary embodiment.

Figure 8:
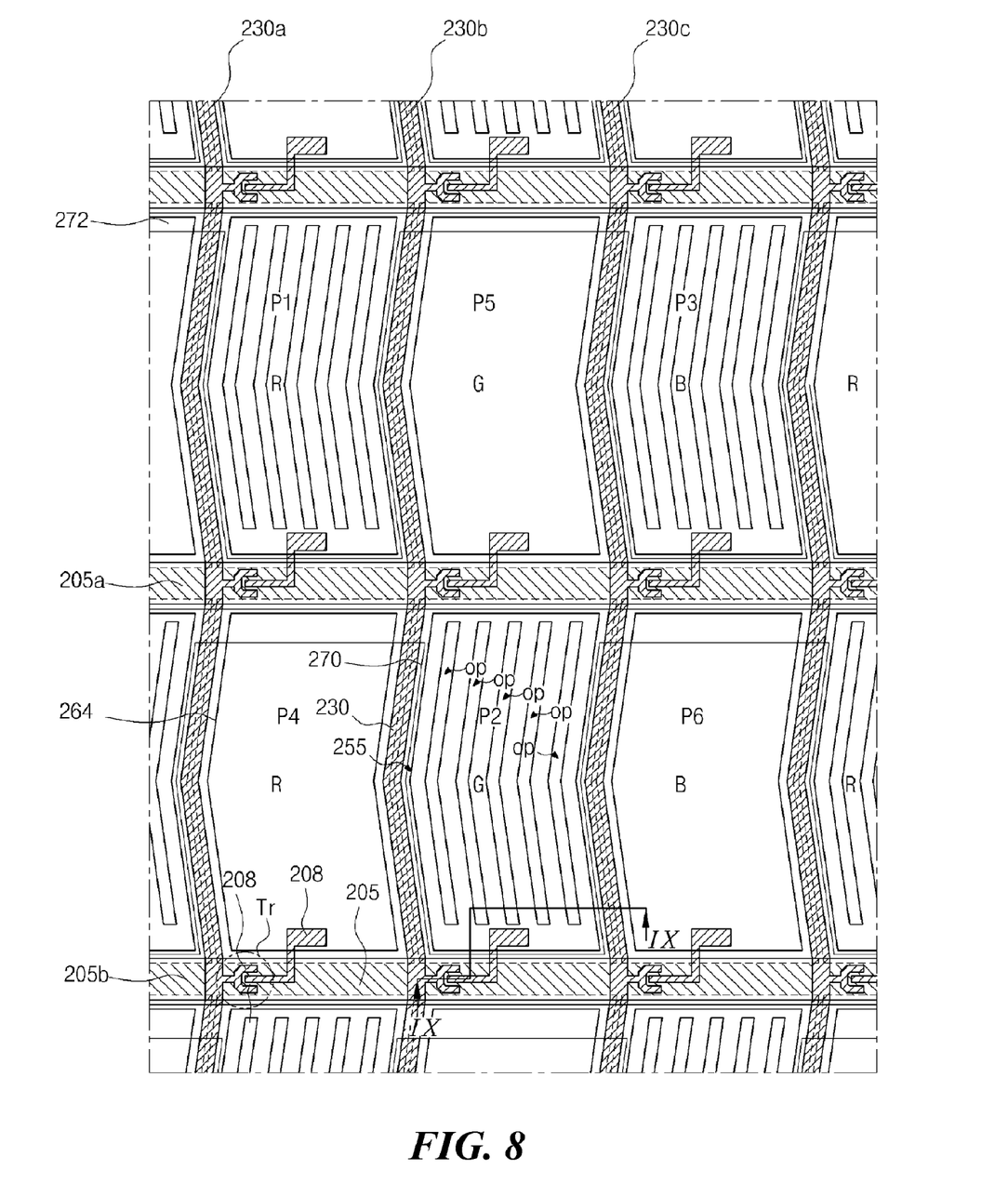
FIG. 8 is a plane view schematically showing a VIC type LCD device according to a second exemplary embodiment of the present invention.
Figure 9:
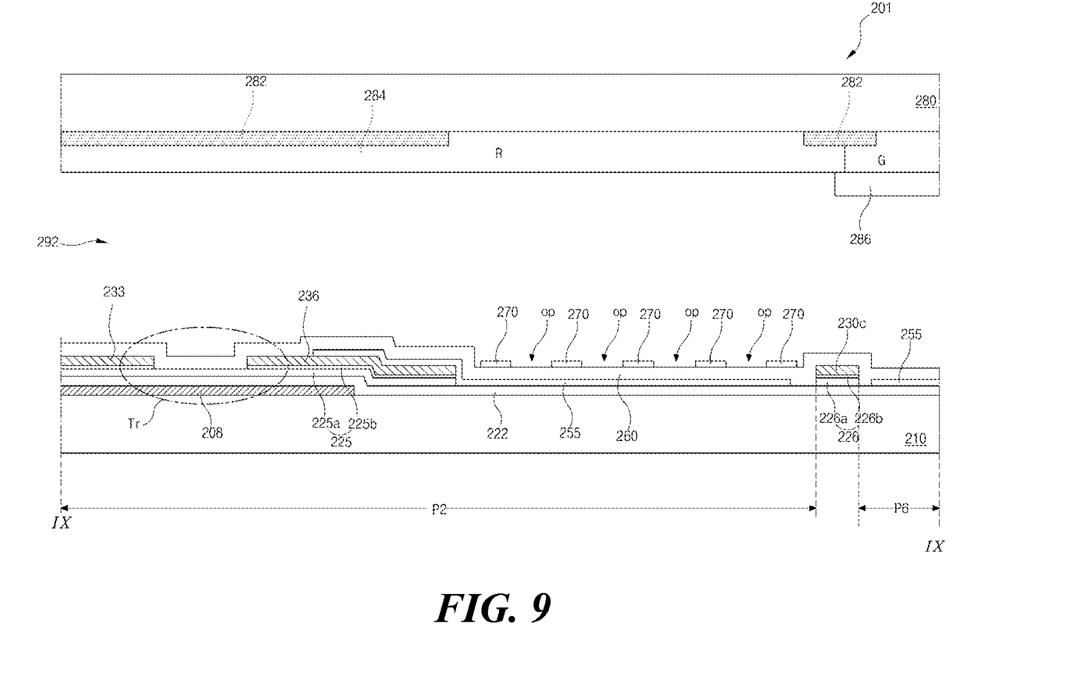
FIG. 9 is a cross-sectional view of the VIC type LCD device taken along a line IX-IX of FIG. 8, and for illustration, only an array substrate is shown and a color filter substrate is omitted in FIG. 8.

FIG. 8 is a plane view schematically showing a VIC type LCD device according to a second exemplary embodiment of the present invention, and FIG. 9 is a cross-sectional view of the VIC type LCD device taken along a line IX-IX of FIG. 8. For illustration, only an array substrate is shown and a color filter substrate is omitted in FIG. 8.

As shown in FIGS. 8 and 9, a VIC type LCD device 201 includes first and second substrates 210 and 280 facing and spaced apart from each other, and a liquid crystal layer 292 disposed between the first and second substrates 210 and 280. First and second gate lines 205a and 205b are formed on an inner surface of the first substrate 210. A gate insulating layer 222 is formed on the first and second gate lines 205a and 205b, and first, second and third data lines 230a, 230b and 230c are formed on the gate insulating layer 222. The gate insulating layer 222 may be formed of an inorganic insulating material such as silicon nitride (SiNx) and silicon oxide (SiO$_2$). The first, second and third data lines 230a, 230b and 230c cross the first and second gate lines 205a and 205b, thereby defining first, second, third, fourth, fifth and sixth pixel regions P1, P2, P3, P4, P5 and P6. These pixel regions P1, P2, P3, P4, P5 and P6 are arranged in a 2×3 matrix, thereby constituting a unit region for a color display.

The first, second and third pixel regions P1, P2 and P3 are driven by a horizontal electric field between a pixel electrode 255 and a first common electrode 270 to have a fringe field switching (FFS) mode, and the fourth, fifth and sixth pixel regions P4, P5 and P6 are driven by a vertical electric field between the pixel electrode 255 and a second common electrode 286 to have an electrically controlled birefringence (ECB) mode. The first, second and third pixel regions P1, P2 and P3 correspond to red, green and blue colors, respectively, and the fourth, fifth and sixth pixel regions P4, P5 and P6 correspond to red, green and blue colors, respectively. In addition, the first, second and third pixel regions P1, P2 and P3 are disposed to make a zigzag horizontal line, and the fourth, fifth and sixth pixel regions P4, P5 and P6 are disposed to make a zigzag horizontal line. Accordingly, the first, fifth and third pixel regions P1, P5 and P3 are disposed in a first row of the 2×3 matrix, and the fourth, second and sixth pixel regions P4, P2 and P6 are disposed in a second row of the 2×3 matrix. Since the fourth, fifth and sixth pixel regions P4, P5 and P6 are not disposed to make a straight horizontal line, a black straight line is not viewed along a front direction, thereby improving display quality of the VIC type LCD device 201.

In each of the first to sixth pixel regions P1 to P6, a gate electrode 208 is formed on the first substrate 210 and connected to each of the first and second gate lines 205a and 205b. The gate insulating layer 222 is formed on the gate electrode 208. A semiconductor layer 225 is formed on the gate insulating layer 222 over the gate electrode 208, and source and drain electrodes 233 and 236 are formed on the semiconductor layer 225. The semiconductor layer 225 includes an active layer 225a of intrinsic amorphous silicon and an ohmic contact layer 225b of impurity-doped amorphous silicon. In addition, the source electrode 233 is connected to each of the first, second and third data lines 230a, 230b and 230c, and the drain electrodes 236 is spaced apart from the source electrode 233. The gate electrode 208, the gate insulating layer 222, the semiconductor layer 225, the source electrode 233 and the drain electrode 236 constitute a thin film transistor (TFT) Tr.

A pixel electrode 255 is formed on the gate insulating layer 222 and is in contact with the drain electrode 236. The pixel electrode 255 may be formed of a transparent conductive material and have a plate shape. A passivation layer 260 is formed on the first, second and third data lines 230a, 230b and 230c and the TFT Tr. The passivation layer 260 may be formed of one of an inorganic insulating material and an organic insulating material. For example, the inorganic insulating material may include silicon nitride (SiNx) and silicon oxide (SiO$_2$), and the organic insulating material may include benzocyclobutene (BCB) and acrylic resin.

Further, in each of the first, second and third pixel regions P1, P2 and P3, a first common electrode 270 and a common line 272 are formed on the passivation layer 260 and are connected to each other. The first common electrode 270 may be formed of a transparent conductive material such as indium-tin-oxide (ITO) and indium-zinc-oxide (IZO). The first common electrodes 270 of the first, second and third pixel regions P1, P2 and P3 are connected to each other through the common line 272 parallel to the first and second gate lines 205a and 205b. The first common electrode 270 includes a plurality of open portions "op." Accordingly, when voltages are applied to the pixel electrode 255 and the first common electrode 270, a horizontal electric field, i.e., a fringe field is generated between a boundary portion of each open portion "op" and the pixel electrode 255. Each of the plurality of open portions "op" may have a bent slit shape, and each of the first, second and third data lines 230a, 230b and 230c may have a bent bar shape. Thus, the first, second and third data lines 230a, 230b and 230c have zigzag bar shapes throughout the whole first substrate 210. The plurality of open portions are not limited to the bent slit shape and may have a straight slit shape, or the like. The first, second and third data lines are not limited to the bent bar shape and may have a straight bar shape, or the like.

A black matrix 282 is formed on an inner surface of the second substrate 280, and a color filter layer 284 is formed on the black matrix 282 and the second substrate 280. The black matrix 282 covers the first and second gate lines 205a and 205b, the first, second and third data lines 230a, 230b and 230c and the TFT Tr, and the color filter layer 284 includes red (R), green (G) and blue (B) color filters. For example, the red color filter may correspond to the first and fourth pixel regions P1 and P4, the green color filter may correspond to the second and fifth pixel regions P2 and P5, and the blue color filter may correspond to the third and sixth pixel regions P3 and P6.

Moreover, in each of the fourth, fifth and sixth pixel regions P4, P5 and P6, a second common electrode 286 is formed on the color filter layer 284 to generate a vertical electric field with the pixel electrode 255 over the first substrate 210. In another exemplary embodiment, an overcoat layer may be formed between the color filter layer 284 and the second common electrode 286 for planarizing and protecting the color filter layer 284. Thus, each of the fourth, fifth and sixth pixel regions P4, P5 and P6 may be driven by the vertical electric field between the pixel electrode 255 over the first substrate 210 and the second common electrode 286 over the second substrate 280. Also, a liquid crystal layer 292 is disposed between the first and second substrates 210 and 280.

Accordingly, the first, second and third pixel regions P1, P2 and P3 including red, green and blue color filters, respectively, and the fourth, fifth and sixth pixel regions P4, P5 and P6 including red, green and blue color filters, respectively, constitute a unit region for a full color display. In addition, the first, second and third pixel regions P1, P2 and P3 are driven by the horizontal electric field between the pixel electrode 255 and the first common electrode 270 to have a fringe field switching (FFS) mode, and the fourth, fifth and sixth pixel regions P4, P5 and P6 are driven by the vertical electric field between the pixel electrode 255 and the second common electrode 286 to have an electrically controlled birefringence (ECB) mode.

The first, second and third pixel regions P1, P2 and P3 may have various cross-sectional and plane structures. In another exemplary embodiment, for example, an interlayer insulating layer may be formed between the drain electrode 236 and the pixel electrode 255. In addition, the pixel electrode 255 may include a plurality of open portions, and the first common electrode 270 may have a plate shape.

Consequently, in a VIC type LCD device according to the exemplary embodiments of the present invention, since a viewing angle is adjusted by adding a full color image from three pixel regions for red, green and blue driven in an IPS mode or an FFS mode and a complementary color image from three pixel regions for red, green and blue colors driven in an ECB mode, a full color image is displayed along a front direction and a white image having a predetermined grey level is displayed along an oblique direction. Accordingly, the VIC type LCD device can operate well in a narrow viewing angle mode for a color image as well as a black and white image such as a document having a text. In addition, since three pixel regions driven in an ECB mode are disposed to make a zigzag horizontal line, display of a black straight line is prevented along a front direction, thereby improving the display quality of the VIC type LCD device.

It will be apparent to those skilled in the art that various modifications and variations can be made in the liquid crystal display device and the method of driving the same of embodiments of the present invention. Thus, it is intended that embodiments of the present invention cover the modifications and variations of the embodiments described herein provided they come within the scope of the appended claims and their equivalents.

What is claimed is:

1. A liquid crystal display (LCD) device, comprising:
   first and second substrates facing and spaced apart from each other;
   first and second gate lines on an inner surface of the first substrate;
   first, second and third data lines crossing the first and second gate lines, thereby defining first, second, third, fourth, fifth and sixth pixel regions;
   a thin film transistor connected to one of the first and second gate lines and one of the first, second and third data lines;
   a first pixel electrode and a first common electrode in each of the first, second and third pixel regions, the first pixel electrode connected to the thin film transistor and the first common electrode spaced apart from the first pixel electrode;
   a second pixel electrode in each of the fourth, fifth and sixth pixel regions, the second pixel electrode connected to the thin film transistor and having a plate shape;
   a black matrix on an inner surface of the second substrate;
   a color filter layer on the black matrix, the color filter layer including red, green and blue color filters, the red color filter corresponding to each of the first and fourth pixel regions, the green color filter corresponding to each of the second and fifth pixel regions, and the blue color filter corresponding to each of the third and sixth pixel regions;
   a second common electrode on the color filter layer in each of the fourth, fifth and sixth pixel regions; and
   a liquid crystal layer between the first and second substrates.

2. The liquid crystal display device according to claim 1, wherein the first pixel electrode and the first common electrode are parallel to each other to generate a horizontal electric field, thereby driving the first, second and third pixel regions.

3. The liquid crystal display device according to claim 2, wherein the first, second and third pixel regions are driven by the horizontal electric field to have an in-plane switching (IPS) mode.

4. The liquid crystal display device according to claim 2, wherein the first pixel electrode and the first common electrode each have a bar shape.

5. The liquid crystal display device according to claim 2, wherein the first pixel electrode and the first common electrode each have a bent shape.

6. The liquid crystal display device according to claim 2, wherein the first, second and third pixel regions are driven by the horizontal electric field to have a fringe field switching (FFS) mode.

7. The liquid crystal display device of claim 6, wherein a passivation layer is formed between the first pixel electrode and the first common electrode, and wherein one of the first pixel electrode and the first common electrode has a plate shape and the other of the first pixel electrode and the first common electrode includes a plurality of open portions each having a slit shape.

8. The liquid crystal display device according to claim 1, wherein the second pixel electrode and the second common electrode generate a vertical electric field, thereby driving the fourth, fifth and sixth pixel regions.

9. The liquid crystal display device according to claim 8, wherein the fourth, fifth and sixth pixel regions are driven by the vertical electric field to have an electrically controlled birefringence (ECB) mode.

10. The liquid crystal display device according to claim 1, wherein the first, second, third, fourth, fifth and sixth pixel regions are arranged in a 2×3 matrix, thereby constituting a unit region for a color display.

11. The liquid crystal display device according to claim 10, wherein the first, second and third pixel regions are arranged in a first row of the 2×3 matrix and the fourth, fifth and sixth pixel regions are arranged in a second row of the 2×3 matrix.

12. The liquid crystal display device according to claim 10, wherein the first, fifth and third pixel regions are arranged in a first row of the 2×3 matrix, and the fourth, second and sixth pixel regions are arranged in a second row of the 2×3 matrix.

13. The liquid crystal display device according to claim 12, wherein the first, second, third pixel regions are disposed to make a zigzag horizontal line, and the fourth, fifth and sixth pixel regions are disposed to make a zigzag horizontal line.

14. The liquid crystal display device according to claim 12, wherein the first common electrode includes a plurality of open portions.

15. The liquid crystal display device according to claim 14, wherein the plurality of open portions each include a bent slit.

16. A viewing-angle image control (VIC) type liquid crystal display (LCD) device, comprising:
   first and second substrates facing and spaced apart from each other;
   first and second gate lines on an inner surface of the first substrate;
   first, second and third data lines crossing the first and second gate lines, thereby defining first, second, third, fourth, fifth and sixth pixel regions;
   a thin film transistor connected to one of the first and second gate lines and one of the first, second and third data lines;
   a first pixel electrode and a first common electrode in each of the first, second and third pixel regions, the first pixel electrode connected to the thin film transistor and the first common electrode spaced apart from the first pixel electrode;
   a second pixel electrode in each of the fourth, fifth and sixth pixel regions, the second pixel electrode connected to the thin film transistor and having a plate shape;
   a black matrix on an inner surface of the second substrate;
   a color filter layer on the black matrix, the color filter layer including red, green and blue color filters, the red color filter corresponding to each of the first and fourth pixel regions, the green color filter corresponding to each of the second and fifth pixel regions, and the blue color filter corresponding to each of the third and sixth pixel regions;

a second common electrode on the color filter layer in each of the fourth, fifth and sixth pixel regions; and a liquid crystal layer between the first and second substrates.

17. A method of driving a liquid crystal display device comprising: first and second substrates facing each other with a liquid crystal layer between the first and second substrates and having first, second, third, fourth, fifth and sixth pixel regions; a first pixel electrode and a first common electrode in each of the first, second and third pixel regions on an inner surface of the first substrate, the first common electrode spaced apart from the first pixel electrode; a second pixel electrode having a plate shape in each of the fourth, fifth and sixth pixel regions; a color filter layer on an inner surface of the second substrate, the color filter layer including a red color filter corresponding to each of the first and fourth pixel regions, a green color filter corresponding to each of the second and fifth pixel regions, and a blue color filter corresponding to each of the third and sixth pixel regions; and a second common electrode on the color filter layer in each of the fourth, fifth and sixth pixel regions, the method comprising:

applying a first voltages to the first pixel electrode to generate a horizontal electric field between the first pixel electrode and the first common electrode in each of the first, second and third pixel regions; and applying a second voltage to the second pixel electrode to generate a vertical electric field between the second pixel electrode and the second common electrode in each of the fourth, fifth and sixth pixel regions.

18. The method of claim 17, wherein the first to sixth pixel regions correspond to first to sixth grey levels along an oblique direction with respect to the liquid crystal display device such that a sum of the first and fourth grey levels, a sum of the second and fifth grey levels, and a sum of the third and sixth grey levels are the same as one another.

* * * * *